Dec. 11, 1956 E. A. REIBIG 2,773,395
POWER TRANSMISSION MECHANISMS
Filed Nov. 7, 1952 5 Sheets-Sheet 1

INVENTOR
ERIC A. REIBIG

BY Strauch, Nolan & Diggins
ATTORNEYS

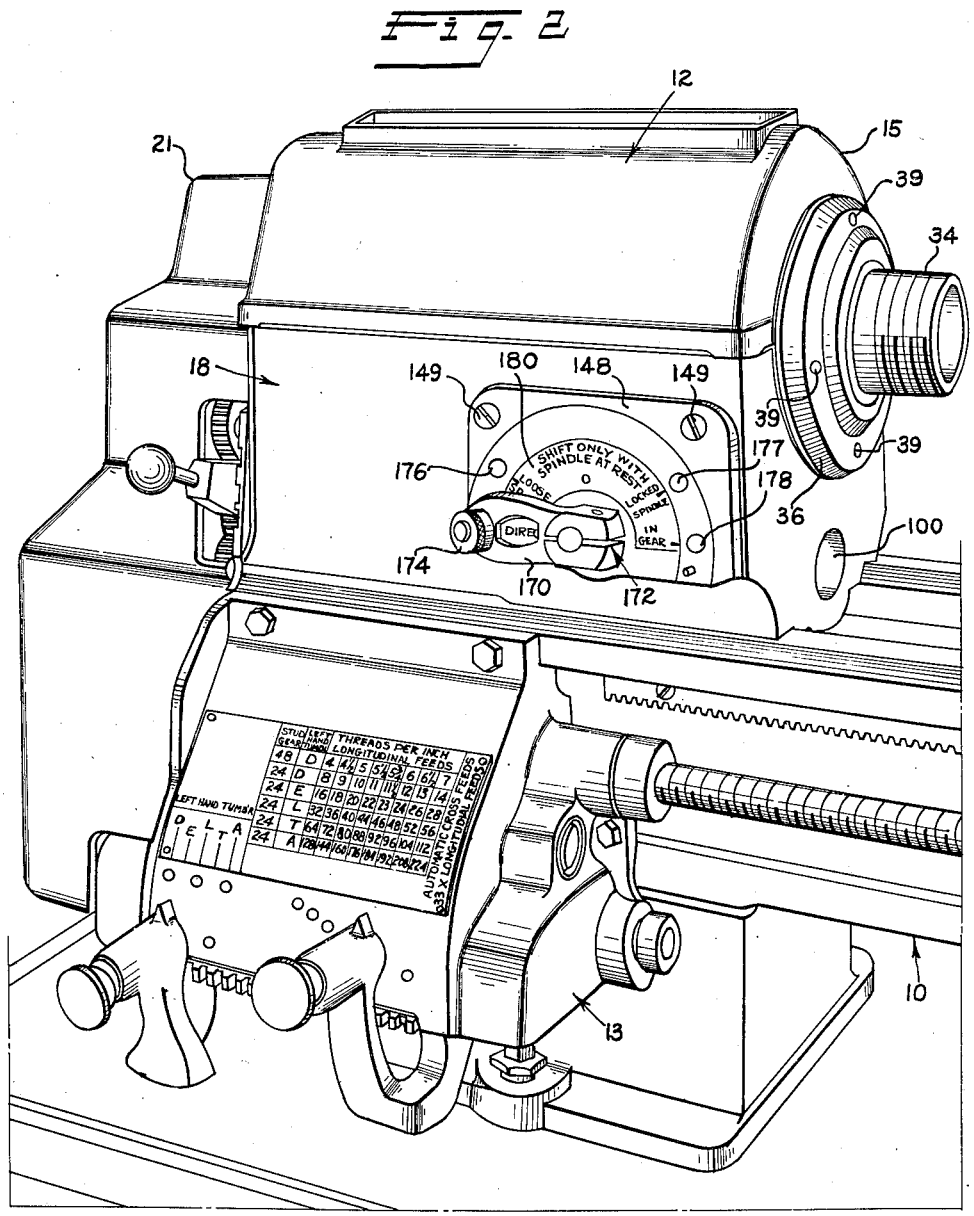

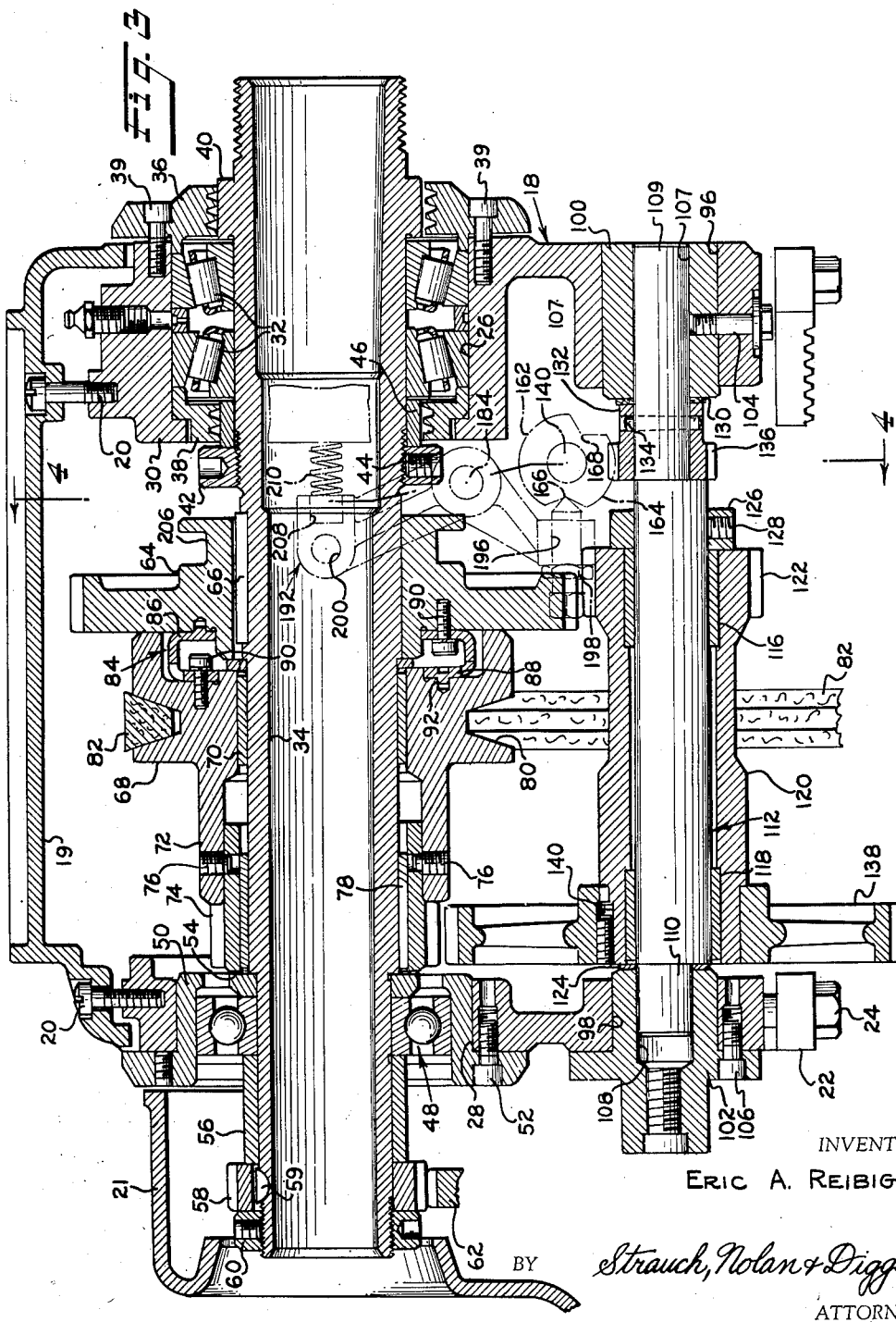

Dec. 11, 1956    E. A. REIBIG    2,773,395
POWER TRANSMISSION MECHANISMS
Filed Nov. 7, 1952    5 Sheets-Sheet 4
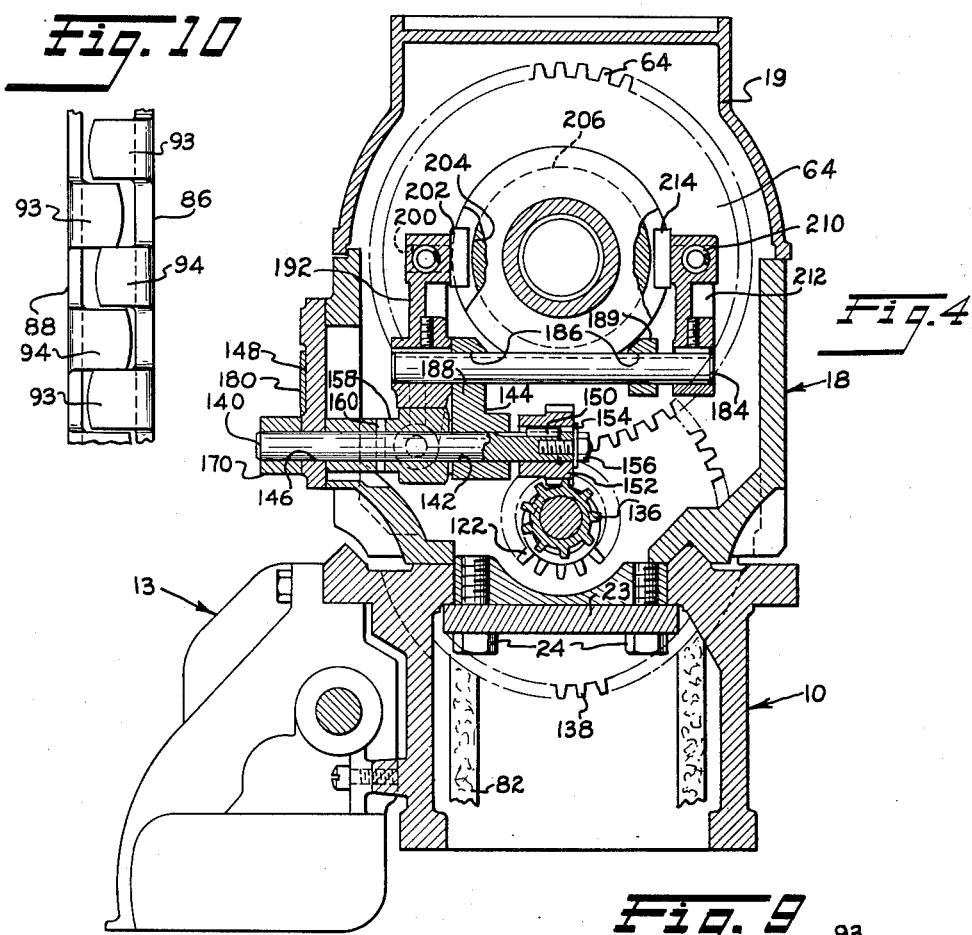
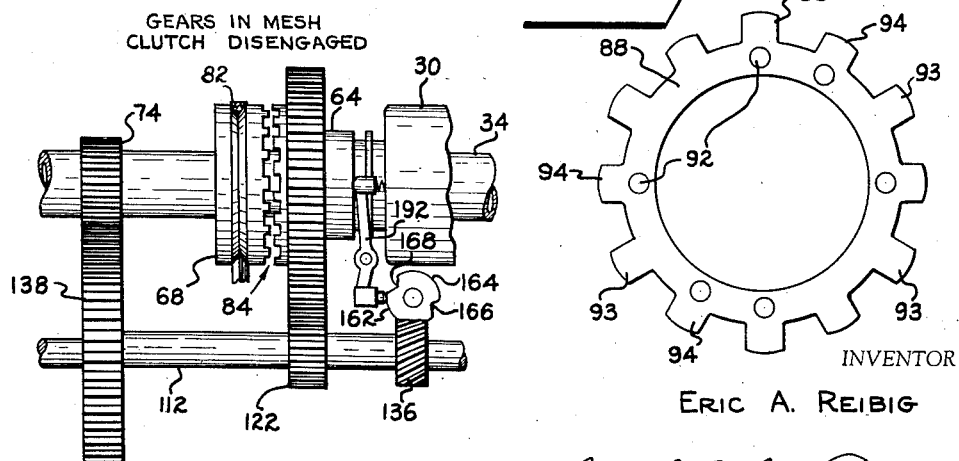
INVENTOR
ERIC A. REIBIG
BY Strauch, Nolan & Diggins
ATTORNEYS Dec. 11, 1956 E. A. REIBIG 2,773,395
POWER TRANSMISSION MECHANISMS
Filed Nov. 7, 1952 5 Sheets-Sheet 5

LOOSE SPINDLE
GEARS NOT IN MESH
CLUTCH DISENGAGED

LOCKED SPINDLE
GEARS IN MESH
CLUTCH ENGAGED

INVENTOR
ERIC A. REIBIG
BY Strauch, Nolan & Diggins
ATTORNEYS

United States Patent Office 2,773,395
Patented Dec. 11, 1956

2,773,395

POWER TRANSMISSION MECHANISMS

Eric A. Reibig, Milwaukee, Wis., assignor to Rockwell Manufacturing Company, Pittsburgh, Pa., a corporation of Pennsylvania Application November 7, 1952, Serial No. 319,243

14 Claims. (Cl. 74—333)

This invention relates to power transmission and change speed mechanisms and more particularly to such mechanisms especially adapted for use with power driven rotary tools such as lathes.

The invention will be described and illustrated in connection with a lathe to which it has particular application although it will be understood that it is not restricted to such uses.

It has long been recognized that in order to provide for efficient operation of lathes equipped with a work gripping chuck attached directly to the power driven spindle, four different spindle drive conditions are necessary. First it is desirable that the spindle be firmly held against rotation to permit the work gripping chuck to be tightened or loosened as required to properly grip and release the work.

Then, in setting up a job it is necessary that the spindle be freely rotatable to facilitate indicating the work with a dial indicator or similar instrument. Also it is desirable that the spindle speed be variable through a suitable range to permit the utilization of the lathe with maximum effectiveness for working on different kinds of materials for a wide variety of machining operations. It has been proposed to effect the desired speed variations by the provision of "back gears" together with a direct drive arrangement arranged to be operated alternately with the back gears.

While prior devices are capable of providing each one of these spindle connections it has been invariably necessary in such devices in order to effect the change from one condition to another to perform a number of time consuming manual operations, in many cases including partial disassembly of the machine for example by removing the head stock cover for the purpose of making internal adjustments.

It is, accordingly, a primary object and purpose of the present invention to provide an improved power transmission assembly particularly adapted for lathes including novel control means which may be selectively operated to lock the spindle, to render the spindle freely rotatable independent of the transmission mechanism and to drive the spindle at more than one speed.

It is also an object to provide an improved power transmission assembly for lathes and the like operable to selectively establish a number of conditions of drive for the driven power output element through the manipulation of a single external lever.

It is an additional object to provide a novel clutch assembly for use in a power transmission device.

It is a further object to provide a power transmission assembly comprising a minimum number of structurally rugged compactly arranged parts which are readily accessible for maintenance and inspection.

Further objects and advantages will become apparent as the description proceeds in connection with the accompanying drawings wherein:

Figure 2 is an enlarged perspective view of the lathe head stock shown in Figure 1.

Figure 3 is a longitudinal central vertical sectional view of the head stock of Figure 2;

Figure 4 is a transverse sectional view taken along line 4—4 of Figure 3 with parts broken away to show details of construction;

Figures 6, 7 and 8 are fragmentary diagrammatic views of the power transmitting mechanism illustrating the several operating positions;

Figure 9 is a plan view of a blank from which a clutch plate may be formed; and

Figure 10 is an enlarged partial elevation showing the teeth of the clutch elements in mating engagement.

Figure 1:
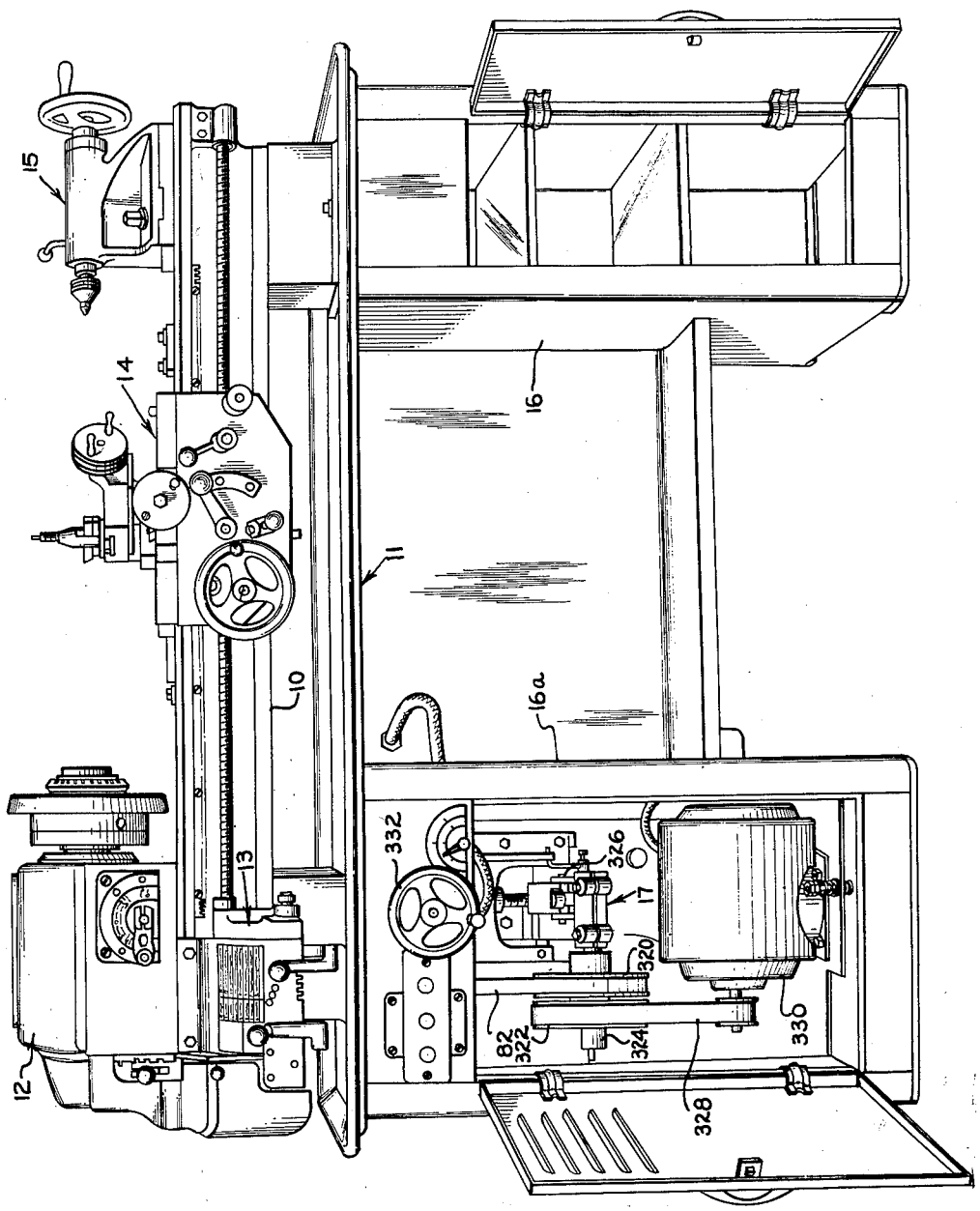
Figure 1 is a perspective view of a lathe which is typical of an installation in which the present invention has particular utility.

Referring now more particularly to the drawings and especially to Figure 1, the principal components of the lathe assembly there shown are the lathe bed 10 mounted on a suitable frame 11, the lathe head stock 12 mounted on the lathe bed 10, the tool feed control box 13 attached to the side of the tool bed operatively connected to the cross feed and tool carrying mechanism 14, and the tail stock 15 mounted on the bed in the usual manner. Opposite ends of the frame 11 are supported on pedestals 16 and 16a, the former providing a convenient storage space and the latter housing a variable speed drive mechanism indicated generally at 17.

Of these components the present invention is concerned primarily with the spindle driving mechanism including the power transmission mechanism housed in the head stock 12.

With continuing reference to the drawing, 18 indicates a heavy hollow casting which forms the main portion of the head stock body which houses and supports the principal components of the novel power transmisison assembly. A top cover member 19 is removably attached to the casting 18 as by screws 20 to enclose and protect the transmission assembly and to provide ready access thereto for inspection and repair.

Figure 5:
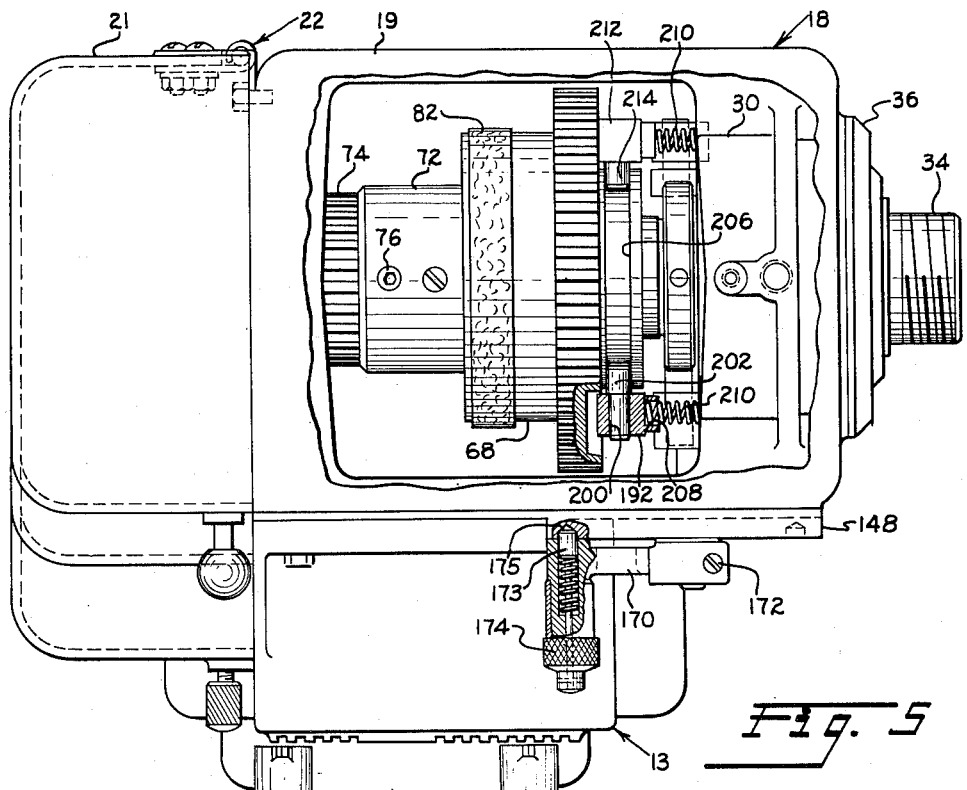
Figure 5 is a top plan view of the head stock of Figures 1 and 2 with the top cover member partially broken away to show interior details.

As best seen in Figure 5 a rear cover member 21 is secured to the casting 18 by a hinge assembly 22. The rear cover encloses a suitable gear train of conventional construction which controls the operation of the tool feed control mechanism 13 which, as stated above, is also of conventional design. The head stock casting with its cover member is adjustably and detachably held in place on the lathe bed 10 by means of a clamp bar 23 which extends between the opposite sides of the bed and is attached to the head stock casing by bolts 24.

It will be noted that the entire head stock assembly is compactly arranged and provides for ready access to any of the transmission components housed therein and may be removed as a unit from the lathe bed merely by removing the two bolts 24.

Referring now more particularly to Figure 3 it will be seen that the casting 18 is provided in its front and rear walls, respectively, with aligned machine bores 26 and 28, the former being formed in a boss 30 of substantial thickness.

Received within the bore 26 are a pair of bearings 32 the inner races of which support the front end of a hollow spindle 34. Suitable front and rear bearing seals 36 and 38 are provided to seal and protect the bearing assemblies, the front seal 36 being attached to the forward end of the housing as by bolts 39 and the rear seal 38 being positioned against a shoulder in the bore 26.

The spindle 34 is held against rearward movement by enlarged section 40 formed integrally thereon which abuts the inner race of the outer bearing 32 and against forward movement by a collar nut 42 threaded onto the spindle and held in place by set screws 44, the collar nut adjustably urging a bushing 46 against the inner of the bearing assemblies 32.

The spindle is supported at its rearward end in a bearing assembly 48 which is received within a retainer 50 held in place within the bore 28 by bolts 52. The bearing 48 is positively positioned on the spindle between a front spacer 54 clamped between the bearing 48 and a shoulder on the spindle and by a rear spacer 56 clamped between the bearing and a gear 58 which is non-rotatably mounted on the spindle by means of a Woodruff key 59 and is held in place against the spacer 56 by a collar nut 60 threaded onto the rearward end of the spindle.

The gear 58 meshes with gear 62 (partially shown) which forms a portion of the tool feed gear train which as stated above is of conventional design and need not be further described.

At a point to the rear of the collar nut 42 a large spindle gear 64 is non-rotatably mounted for longitudinal movement along the spindle 34 by means of a square key indicated at 66. Adjacent the rear face of the large spindle gear 64 a V-belt pulley 68 is freely rotatably supported on spindle 34 by means of a bushing bearing 70. Formed integrally with the rear side of the pulley 68 is an annular extension 72 which telescopes over a reduced section of a small spindle gear 74 and is non-rotatably secured thereto by means of set screws 76. The small spindle gear 74 is rotatably supported on the spindle by means of a bushing bearing 78. While the V-belt pulley 68 is illustrated as having only one notch 80 for supporting the flexible drive belt 82 it will be understood that a three or four step pulley may be substituted for that shown to increase the speed range of the spindle 34 as desired.

The pulley 68 and the large spindle gear 64 are adapted to be selectively drivingly connected and disconnected by a clutch assembly indicated generally at 84.

The clutch assembly 84 comprises a pair of identical plates 86 and 88 secured respectively to the large spindle gear 64 and the belt pulley 68 by means of machine screws 90. The clutch plates may also be held in place by any desired number of stamped projections 92 formed integrally with the respective clutch plates which are received in corresponding recesses in the gear 64 and the pulley 68. Each of the clutch plates is an annular stamping initially formed to the shape shown in Figure 9.

As there shown the annular clutch plates are formed with a series of regularly spaced alternate long and short teeth 93 and 94 respectively. The gear teeth 93 and 94 of the flat stamping shown in Figure 9 are then bent to a position normal to the plane of the flat stamping as shown in Figures 3 and 10. Inasmuch as the long and short teeth are bent on a common circumference they will project outwardly from the plane of the stamping different distances. For example, in a typical installation where the diameter of the formed clutch is approximately four inches, the long teeth will project from the plane of the stamping approximately 1/16 of an inch more than the short teeth. When engaged, the teeth of each of the clutch elements 86 and 88 will assume the relative position shown fragmentarily in Figure 10 with a long tooth of one of the clutch elements received between a long and short tooth of the opposite clutch element. When these clutch elements are resiliently urged together, as hereinafter explained, the clutch elements immediately engage as soon as relative movement occurs between the gear 64 and the pulley 68 irrespective of whether the long teeth are opposite one another or the short teeth are opposite one another.

Despite the simplicity of this clutch construction and the economy with which it may be manufactured it has proved extremely effective and positive in operation and has been found to have a long service life.

With continuing reference to Figure 3 it will be seen that the head stock body casting 18 is provided in its front and rear walls respectively with additional aligned machined bores 96 and 98, the axis of the bores 96 and 98 being below and parallel to the axis of the spindle 34.

Received in the respective bores 96 and 98 are a front bushing 100 and a rear bushing 102, the former being held in place by a machine screw 104 and the latter being attached to the outer surface of the rear wall of the casting 18 by means of one or more screws 106. The bushings 100 and 102 are provided with aligned machined bores 107 and 108, respectively, concentric with bores 96 and 98, in which are rotatably received the oposite reduced mounting portions 109 and 110 of a back shaft 112 which is eccentric with respect to the mounting portions 109 and 110 in the bushings 100 and 102.

Rotatably mounted on back shaft 112 by means of bushing bearings 116 and 118 is a sleeve 120 on the forward end of which is integrally formed a small back gear 122. The sleeve 120 is loosely held against a bushing 124 by means of a collar 126 held in place on back shaft 112 by a set screw 128. A lower shifter spiral gear 136 is non-rotatably secured on the forward mounting portion 109 between fiber washer 130 and the shoulder formed by back shaft 112 by a pin 134.

At its rearward end the sleeve 120 is provided with a reduced machined section on which a large back gear 138 is non-rotatably mounted by means of a set screw 140.

From the above description it will be seen that with the components of the drive mechanism occupying the position illustrated in Figure 3, driving power will be transmitted to the spindle 34 from the V-belt 82 through pulley 68, clutch assembly 84 and large spindle gear 64. In the position shown the back gears 138 and 122 are entirely out of operation. The novel mechanism for controlling the operation of the clutch assembly 84 and engaging and disengaging the back gear train, which forms an important feature of the present invention, will now be described with particular reference to Figures 3, 4, and 5. A shifter shaft 140 is rotatably mounted at spaced points in a machined bore 142 in a boss 144 formed integrally with a forward wall of casting 18 and in an aligned machined bore 146 in a plate 148 which is rigidly attached to the side wall of casting 18 by means of bolts 149. Non-rotatably secured to the inner end of the shaft 140 by means of a square key 150 is an upper shifter spiral gear 152 which meshes with the lower shifter spiral gear 136. The gear 152 is held in place on the shaft 140 by a lock washer 153 and a washer 154 urged against the gear by a hex head machine screw 156 tapped into the inner end of shaft 140.

A back gear shifter cam 158 is non-rotatably secured to shaft 140 intermediate boss 144 and plate 148 by means of a pin 160 as best seen in Figures 3 and 4. The enlarged operating portion of the cam 158 has two circular cam surfaces 162 and 164 of equal radii separated by two detent sections 166 and 168. The shaft 140 carrying the cam 158 and the shifter gear 152 is rotated by a control handle 170 which is secured to the shaft 140 outwardly of the plate 148 by means of a screw and split ring construction indicated at 172 (Figure 2).

As best shown in Figure 5 a spring biased detent 173 which may be retracted by a knob 174 is provided in the handle 170 and is adapted to engage the spaced depressions 175, 176, 177 and 178 formed integrally in the flat surface of plate 148. Each of the detent positions 175, 176, 177 and 178 corresponds to a predetermined operating condition of the power transmission assembly as indicated by the legend plate 180 which is riveted or otherwise secured to the plate 148.

Referring again particularly to Figures 3 and 4, a shaft 184 is rotatably mounted in aligned bores 186, parallel with and spaced from the bore 142, in bosses 188 and 189 formed integrally with the forward wall of the casting 18. A shifter bell crank 192 is rotatably mounted on the shaft 184 and held in place by a set screw 194. At its lower end the bell crank 192 is provided with a threaded bore 196, the axis of which is in the plane of the axis of shaft 140 and normal thereto. Adjustably threaded into the bore 196 is a set screw 198 having a pointed end adapted to engage the cam surfaces of cam 158.

Adjacent its upper end the bell crank is provided with a bore 200 in the same horizontal plane as the axis of spindle 34 and normal thereto. Rotatably received within bore 200 is a reduced section of a shoe 202 which fits snugly between the opposite sides of an annular groove 206 formed in the large spindle gear 64. At right angles to the bore 200 the upper section of the bell crank 192 is provided with a recess 208 which receives a compression spring 210 the other end of which is adapted to freely engage the inner surface of boss 30. A secured shifter crank 212 identical with the upper portion of crank 192 is mounted on the opposite end of shift 184 in alignment with crank 192. Crank 212 carries a shifter shoe 214 identical with shoe 202.

Figure 6:
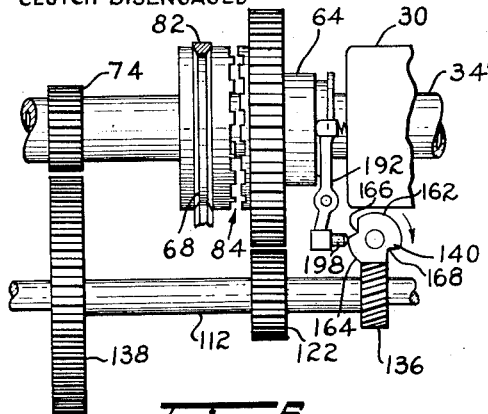

The operation of the power transmission assembly will now be described. With the control lever 170 positioned as indicated in Figure 1 with the detent 173 engaging the recess 175 opposite the legend Direct the remaining components of the drive assembly will be disposed in the position indicated in Figure 3. As stated above, in this position the drive is transmitted from belt 82 through pulley 68, clutch assembly 84 and large spindle gear 64 directly to the spindle 34. If it is desired to make the spindle 34 freely rotatable independently of the pulley 68, drive belt 82 and the associated power mechanism, the control lever 70 is moved so as to dispose the detent 173 in the notch 176 opposite the legend Loose Spindle. When the lever has been so moved, the components of the transmission assembly will occupy the position shown in Figure 6. It will be seen that the cam 158 has been rotated sufficiently to dispose the leading edge of cam surface 164 opposite the inner end of set screw 198 displacing the latter to the left pivoting the bell cranks 192 and 212 in a clockwise direction sufficiently to move the large spindle gear 64 forward on spindle 34 to disengage the clutch assembly 84. Although the rotation of shaft 140 has also caused slight rotation of the back shaft 112, this rotation has not been sufficient to elevate sleeve 120 and the back gears into engagement with the spindle gears. If the belt 82 is driven the pulley 68 will merely idle on spindle 34. On the other hand spindle 34 may be freely turned without rotating pulley 68 and the power mechanism for driving belt 82.

Figure 7:
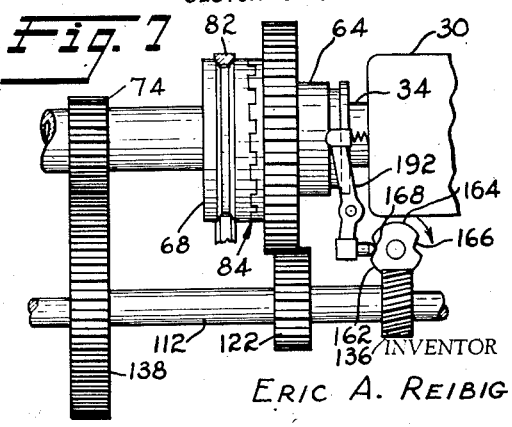

When the handle 170 is moved in a clockwise direction so that the detent 173 is positioned in notch 177 opposite the legend Locked Spindle the components of the power transmission assembly will assume the position shown in Figure 7. It will be seen that when the handle is so rotated the shifter gear 152 has been rotated sufficiently to elevate sleeve 120 and back gears 122 and 138 into engagement with the respective spindle gears 64 and 74. At the same time the depression 168 in the cam 158 is positioned opposite the point of the set screw 198. The bell cranks 192 and 212 are thus allowed to rotate in a counter clockwise direction under the influence of springs 210 shifting the large spindle gear 64 to the left engaging the clutch assembly 84. With both the clutch 84 and the back gears in driving engagement the spindle will be positively locked against rotation. In this position the works holding chuck can be tightened or loosened as desired since movement of the spindle is restrained in both directions.

Further movement of the control handle to the position opposite the legend In Gear will dispose the components of the transmission in the position shown in Figure 8. As there shown the back gears are in driving engagement with the spindle gears and the rotation of the control handle between the Locked Spindle and In Gear positions has disposed the cam surface 162 opposite the set screw 198 rotating the bell cranks 192 and 212 in a clockwise direction to shift large spindle gear 64 to the right disengaging clutch assembly 84. Thus, the driving power will be transmitted from belt 82 through pulley 68, small spindle gear 74, large back gear 138 small back gear 122 and large spindle gear 64 to the spindle. Because of the proportioning of the spindle and back gears the spindle will be driven at approximately one sixth the speed effected by the direct drive for any speed of belt 82.

positions, to positively disengage the clutch assembly 84. However, when the control lever is moved to the Direct or Locked Spindle positions the clutch components are yieldingly urged together rather than positively engaged. This facilitates engagement of the clutch and prevents damage to the clutch elements or the elements of the control assembly.

The flexibility and range of operation of the lathe mechanism may be greatly increased by the utilization of the variable speed drive mechanism indicated generally at 17 in conjunction with the above described change speed mechanism enclosed in the lathe head stock 12. With particularly reference to Figure 1, it will be seen that the belt 82 which is drivingly connected with the pulley 68 extends around a driving pulley 320. The pulley 320 is coaxially mounted with a second pulley 322 on a shaft 324, the shaft 324 being rotatably supported as at 326 for bodily shifting movement in a vertical direction. The pulley 322 is drivingly connected by a belt 328 to the pulley of an electric motor 330 of suitable size. The pulleys 320 and 322 are variable speed pulleys having relatively movable sheaves and the relative speed of belts 82 and 328 may be controlled by raising or lowering the axis of shaft 324 in accordance with conventional practice. The position of shaft 324 may be controlled by a hand wheel 332 operatively connected by suitable means, not shown, to the supporting means for shaft 324.

The use of the variable speed drive together with the change speed mechanism affords vernier control of speeds throughout two operating ranges. The high speed range is effected when the handle 170 is moved to the "direct drive" position and the low speed range is operative when the handle 170 is moved to the "direct drive" position and the low speed range is operative when the handle 170 is moved to the "in gear" position. With proper proportioning of the gears and belt drives it is possible to operate the spindle at speeds well within both the normal metal working and wood working ranges so that the lathe has an extended range of operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine tool having a rotatable spindle, a driving element rotatably mounted on said spindle and fixed against axial movement thereon, a first gear on said spindle mounted for rotation with said driving element, a second gear non-rotatably mounted on said spindle for axial movement thereon, cooperating clutch means on said element and said second gear for establishing a driving connection therebetween, a gear train adapted to drivingly connect said first and second gears, and manual means associated with said second gear and said gear train for selectively controlling the operative connection between said gear train, said driving element and said second gear, and for selectively axially moving said second gear for controlling engagement of said clutch means to connect and disconnect said second gear and said driving element.

2. In a machine tool having a rotatable spindle mounted in a frame, a driving element rotatably mounted on said spindle and fixed against axial movement thereon, a gear non-rotatably mounted on said spindle cooperating clutch elements on said gear and said driving element, said gear being axially movable to move the clutch element on said gear into and out of driving engagement with the clutch element on said driving element, a back shaft, means eccentrically mounting said back shaft in said frame in parallel spaced relation to said spindle, a gear train on said back shaft adapted to drivingly connect said element and said gear, manual means for rotating said back shaft to selectively drivingly connect said gear train, said element and said gear, and means pivotally mounted in said frame operably connecting said manual rotating means and said gear for axially shifting said gear to move the clutch element thereon into and out of driving engagement with the clutch element on said driving element in predetermined timed relation with the movement of said back shaft.

3. In a machine tool having a frame, a spindle mounted on the frame, a driven gear non-rotatably secured to said spindle for axial movement relative thereto, a first driving means adapted to drive said driven gear at a first speed, a second driving means adapted to drive said driven gear at a different speed, mounting means in said frame eccentrically supporting said second driving means, means for rotating said mounting means to bodily shift said second driving means into and out of driving engagement with said driven gear and said first driving means, means pivotally mounted in said frame for axially shifting said driven gear into and out of driving engagement with said first driving means, and means for moving said pivotally mounted means in timed relation with said means for rotating said mounting means whereby said driven gear is selectively driven by said first and second driving means.

4. In a machine tool having a spindle, a first driving means for said spindle, a driven gear non-rotatably secured to said spindle and axially movable thereon into and out of driving engagement with said first driving means, a second driving means, an eccentric mounting for said second driving means whereby, upon rotation of said mount, said second driving means will be bodily moved into and out of driving engagement with said driven gear, means for rotating said mounting through a cycle to effect said bodily movement, and shifting means operably connected to said driven gear and said rotating means to successively axially shift said gear into and out of engagement with said first driving means.

5. In a machine tool having a frame, a rotatable spindle mounted in said frame, a driving element rotatably mounted on said spindle and fixed against axial movement thereon, a first gear rotatably supported on said spindle and secured to said driving element, a second gear non-rotatably mounted on said spindle for axial movement thereon, cooperating clutch members on said driving element and said second gear operable to establish a driving connection between said driving element and said second gear when said second gear is axially moved along said spindle, a back shaft, means eccentrically mounting said back shaft in said frame, third and fourth gears on said back shaft in opposed relation, respectively, with said first and second gears, means mounted in said frame for axially shifting said second gear to move said clutch elements into and out of operating engagement, and means operatively connected to said last-mentioned means for rotating said back shaft to selectively engage and disengage said first and third gears and said second and fourth gears.

6. A power transmission mechanism comprising a frame, first and second shafts rotatably mounted in said frame, a first pair of gears mounted on said first shaft, a second pair of gears mounted on said second shaft in opposed relation, respectively, with the gears on said first shaft, an axially fixed power input element mounted on said first shaft, means drivingly connecting one of said first pair of gears and said driving element, means for moving the other of said first pair of gears on said first shaft axially into and out of axially fixed driving relation with said driving element, and means operably connected to the last-mentioned means to selectively position said second shaft with respect to said first shaft to selectively drivingly connect and disconnect said first and second pair of gears in predetermined relation with the action of said last-mentioned means.

7. A power transmission mechanism comprising a shaft, an axially fixed power input element rotatably mounted on said shaft, a power transmitting member non-rotatably mounted on said shaft axially movable along said shaft into and out of power transmitting relation with said power input element, a gear train adapted to drivingly connect said element and said member, a control lever, and means responsive to movement of said control lever to axially move said member into and out of power transmitting relation with said power input element and to drivingly connect and disconnect said gear train and said power transmitting member in predetermined relation with the axial movement thereof.

8. In a power transmitting mechanism, a shaft, an axially fixed power element rotatably mounted on said shaft, a first gear non-rotatably mounted on said shaft for limited axial movement therealong, cooperating clutch means on adjacent faces of said element and said first gear adapted to establish a driving connection therebetween, a second gear movable into and out of operating engagement with said first gear, means for controlling the engagement between said first and second gears, and means responsive to the movement of said last-mentioned means for axially shifting said first gear and thereby engaging and disengaging said clutch means in timed relation with the movements of said second gear.

9. In a machine tool having a driven spindle carrying a work piece support for rotation therewith: a power transmitting mechanism for said spindle comprising a main driving element rotatably mounted on said spindle; means drivingly connecting said main driving element to a power source; a primary drive gear mounted on said spindle for rotation therewith and arranged on said spindle for sliding movement toward and away from said main driving element; mating clutch elements on said main driving element and said primary drive gear; a secondary drive gear rotatably mounted on said spindle and drivingly connected to said main driving element; a back gear shaft assembly including an eccentric shaft; first and second back gears rotatably mounted on said eccentric shaft in opposed relation, respectively, with said primary and secondary drive gears; a worm non-rotatably connected to said eccentric shaft; a shifter element operatively connected to said primary drive gear for slidably shifting said primary drive gear to engage and disengage said clutch elements; a rotatable control shaft; a control cam non-rotatably supported on said control shaft and adapted to engage a portion of said shifter element; and a worm pinion mounted on said control shaft and drivingly engaging said worm, said control shaft, upon rotation, being adapted to simultaneously actuate said shifter element and rotate said worm to successively disengage said clutch elements to disrupt the drive from said main driving element to said spindle through said primary drive gear, to then engage said back gears with said primary and secondary drive gears to establish a driving connection from said main drive element to said spindle through said back gears and then to reengage said clutch elements while said back gears are engaged to lock said spindle against rotation.

10. The combination defined in claim 9 together with a variable speed drive mechanism connecting said power source and said main driving element whereby said spindle may be driven at a variable speed when said main driving element and said primary gear are engaged or when said back gears and said primary and secondary drive gears are engaged.

11. In a machine tool having a driven spindle carrying a workpiece support for rotation therewith; a transmission adapted to drivingly connect said spindle to a power source to selectively drive said spindle at two different speeds, lock said spindle against rotation and free said spindle from all driving connection with said power source comprising a main driving element rotatably mounted on said spindle; means drivingly connecting said main driving element to said power source; a primary drive gear mounted on said spindle for rotation therewith and arranged on said spindle adjacent one end of said main driving element for sliding movement toward and away from said main driving element; a clutch element on said main driving element; a mating clutch element on said primary drive gear; a secondary drive gear rotatably mounted on said spindle and drivingly connected to said main driving element; a back gear shaft assembly including an eccentric shaft, a first back gear rotatably mounted on said eccentric shaft in position to be engaged with said secondary drive gear, a second back gear rotatably mounted on said eccentric shaft in position to be engaged with said primary drive gear and connected with said first gear for rotation therewith and a worm non-rotatably connected to said eccentric shaft; a shifter element having an arm operatively connected to said primary drive gear for slidably shifting said primary drive gear to engage and disengage said clutch elements and a second arm adapted for engaging a dual control cam; means for biasing said shifter element into engagement with said cam and toward clutch engaged position; a rotatable control shaft; a dual dwell control cam supported for rotation with said control shaft and cooperating with said second arm; and a worm pinion supported for rotation with said control shaft and drivingly engaging said worm, said control shaft upon rotation being adapted to simultaneously actuate said shifter element and rotate said worm and said eccentric shaft to successively move said shifter element out of one dwell to disengage said clutch elements to thereby disrupt the drive from said main driving element to said spindle through said primary gear and thereby disconnect and free said spindle from said power source, then, upon further rotation engage said back gears with said primary and secondary drive gears to establish a driving connection from said main drive element to said spindle, and finally, upon still further rotation of said control shaft, to move said second dwell into engagement with said shifter element to reengage said clutch elements while said back gears are engaged to lock said spindle against rotation.

12. In a metal cutting machine tool having a driven spindle carrying a workpiece support for rotation therewith: a variable speed power transmission for said spindle comprising a power source; a variable speed drive pulley drivingly connected to said power source; a variable speed driven pulley rotatably mounted on said spindle; belt means drivingly connecting said variable speed pulleys; means mounting said variable speed drive pulley for movement toward and away from said variable speed driven pulley to drive said driven pulley at any selected speed between the minimum and maximum speed ratio provided by said pulleys; a main driving gear non-rotatably mounted on said spindle for axial movement toward and away from said driven pulley; a second driving gear carried by said driven pulley for rotation therewith; an eccentrically mounted set of back gears adapted to be selectively engaged with said main driving gear and said second driving gear to establish a low speed or back gear drive connection between said driven pulley and said spindle; mating clutch members respectively carried by said driven pulley and said main driving gear adapted to be selectively engaged to establish a high speed or direct drive connection between said driven pulley and said spindle; and a single control means having a connection to said eccentrically mounted set of back gears and a second connection to said main drive gear and adapted in one position to engage said clutch members and position said back gears out of driving engagement with said main and said second driving gears to establish one range of driving speeds for said spindle, in a second position to disengage said clutch members and position said back gears out of driving engagement with said main and said second driving gears to establish a free spindle condition wherein said spindle is devoid of all driving connection to said driven pulley and freely rotatable, in a third position to disengage said clutch members and position said back gears in driving engagement with said main and said second driving gears to establish a second range of driving speeds for said spindle and in a fourth position to engage both said clutch members and said back gears and said main and said second driving gears to establish a locked spindle condition wherein said spindle is connected to said driven pulley through both driving trains and held against rotation by reason of the two different speed drive connections between the spindle and said driven pulley.

13. In a machine tool having a frame: a driven spindle rotatably mounted in said frame; a power transmitting mechanism for said spindle comprising an axially fixed main driving element rotatably mounted on said spindle and adapted to be connected to a power source; a primary drive gear mounted on said spindle for rotation therewith and arranged on said spindle for sliding movement toward and away from said driving element; mating clutch elements on said main driving element and said primary drive gear; a secondary drive gear rotatably mounted on said spindle and drivingly connected to said main driving element; a back gear shaft assembly including an eccentric shaft; first and second back gears rotatably mounted on said eccentric shaft in opposed relation, respectively, with said primary and secondary drive gears; a shifter element pivotally mounted in said frame and operatively connected to said primary drive gear for slidably shifting said primary drive gear to engage and disengage said clutch elements; a rotatable control shaft mounted in said frame for rotation about an axis transverse to the spindle axis; a control lever on the said control shaft mounted externally of said frame adjacent one end of said spindle; and means on said control shaft cooperating with means on said shifter element and said eccentric shaft operable upon movement of said control lever and corresponding rotation of said control shaft to successively disengage said clutch elements to disrupt the drive from said main driving element to said spindle through said primary drive gear, to then engage said back gears with said primary and secondary drive gears to establish a driving connection from said main driving element to said spindle through said back gears and then to reengage said clutch elements while said back gears are engaged to lock said spindle against rotation.

14. In a machine tool having a spindle rotatably mounted in a frame: a power transmission mechanism for said spindle comprising an axially fixed driving element rotatably mounted on said spindle, a first gear on said spindle mounted for rotation with said driving element, a second gear nonrotatably mounted on said spindle for axial movement thereon, cooperating clutch means on said driven element and said second gear for selectively establishing a driving connection therebetween, a gear train adapted to drivingly connect said first and second gears, a shifter element pivotally mounted on said frame and operatively connected to said second gear for slidably shifting said second gear to engage and disengage said clutch elements; a rotatable control shaft mounted in said frame for rotation about an axis transverse to the spindle axis; a control lever on said control shaft mounted externally of said frame; and means on said control shaft cooperating with means on said shifter element and said gear train operable upon movement of said control lever and corresponding rotation of said control shaft for selectively controlling the operative connection between said gear train, said driving element and said second gear and for selectively controlling engagement of said clutch means to connect and disconnect said second gear and said driving element.

References Cited in the file of this patent

UNITED STATES PATENTS 2,159,694    Gorham _____ May 23, 1939